Patented Aug. 5, 1924.

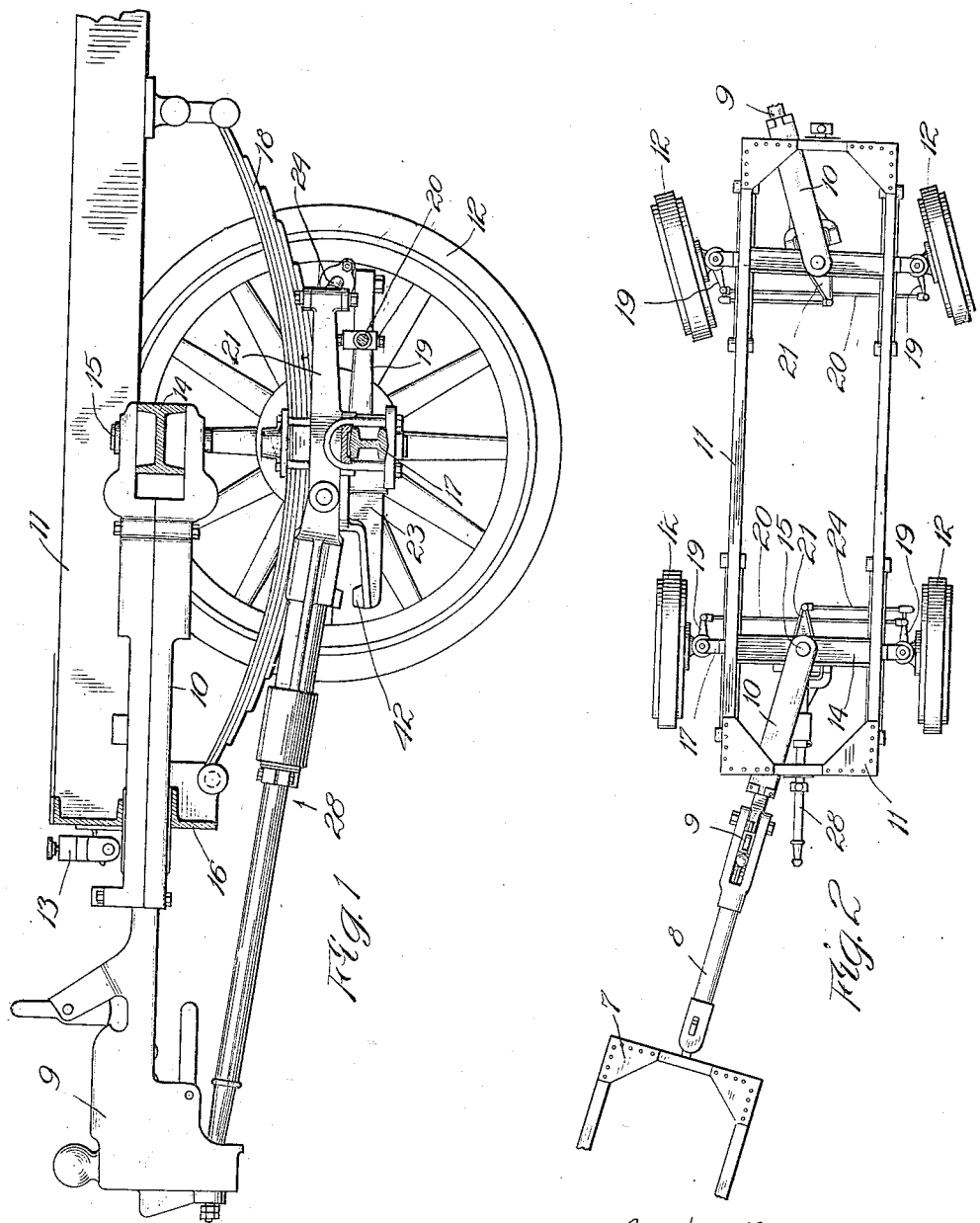

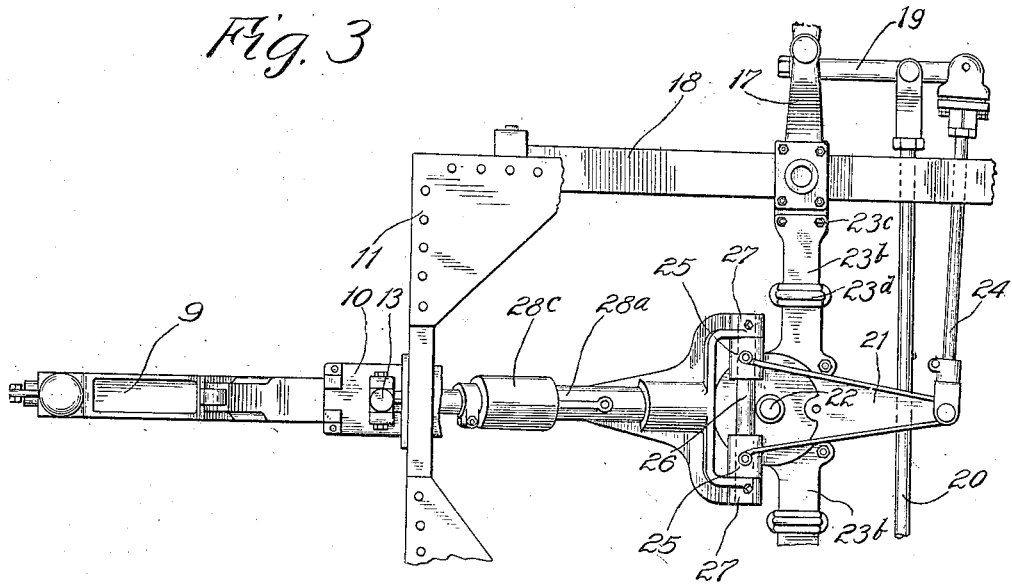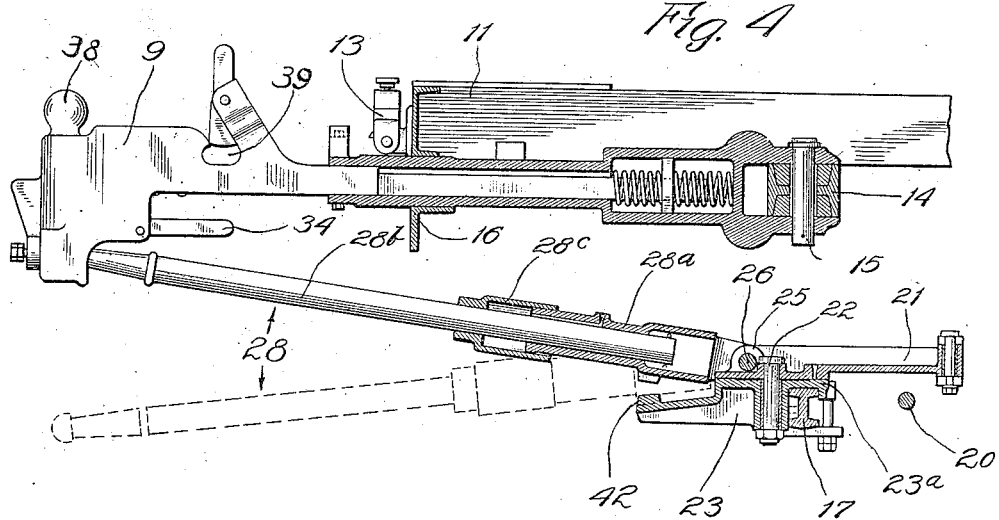

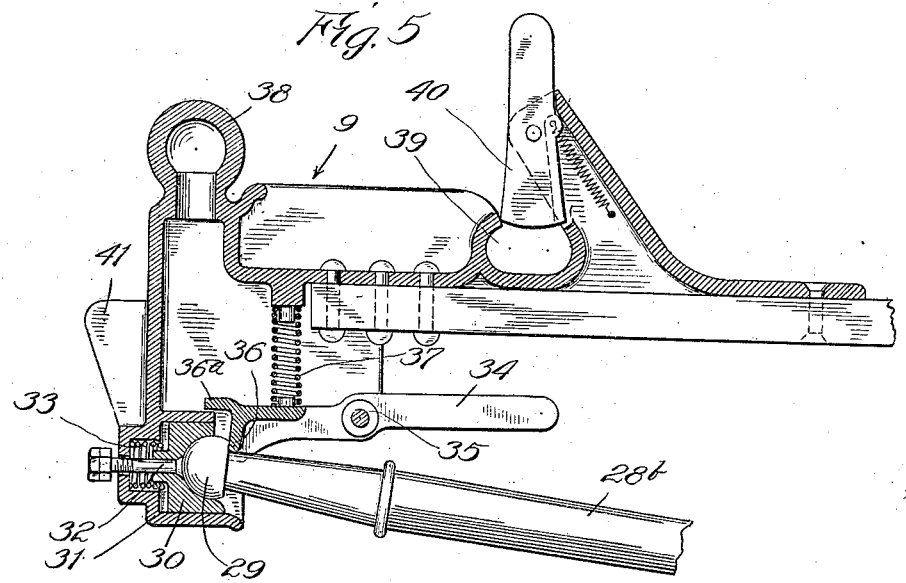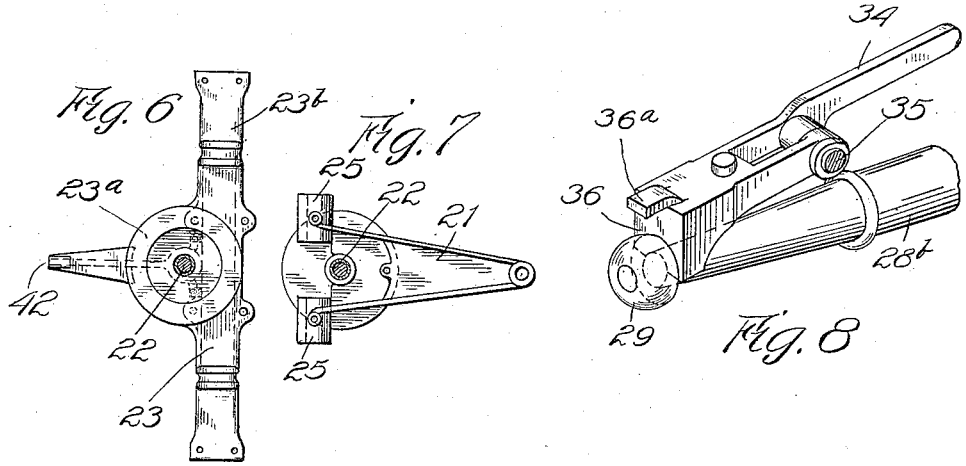

1,503,815

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF WISCONSIN.

TRAILER TRUCK.

Application filed July 10, 1920. Serial No. 395,273.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer Trucks, of which the following is a specification.

This invention relates to steering mechanism for a four-wheel trailer truck of the reversible type, that is to say, wherein the truck may be drawn and steered from either end, the front pair of wheels being attached to the draw bar to be steered thereby while the rear pair of wheels is locked in position parallel to the body frame of the truck.

In moving a trailer truck of this character into and out of positions to load and unload the same, it is frequently necessary to back up the trailer and the drawing unit (usually a motor truck), and it may often be necessary to back from the street into an alley running at right angles thereto or even to back the motor truck and trailer through a sinuous path in order to get around other trucks, railroad cars, loading platforms, or other obstacles.

In order to obtain the maximum flexibility and to facilitate the operation under conditions such as described, it is desirable that the steering device which connects the draw-bar to the wheels be capable of being disconnected so that the wheels may, at times, be locked in position parallel to the body frame or perpendicular to the axle, and may, at other times, be connected to the draw-bar to be steered thereby, and may, at still other times, be disconnected altogether so as to allow the wheels to be manually swung by the operator.

To facilitate an understanding of the purposes of such a construction it may be said that when the trailer is being drawn forwardly the front wheels are connected to the draw-bar to be steered thereby while the rear wheels are locked in position parallel to the body frame. When the trailer is being backed, the front wheels, i. e., the wheels near the motor truck, are detached from the draw-bar and locked in position parallel to the body frame so that they will run in a straight line, leaving the draw-bar which is attached to the motor truck free to swing through its full arc without affecting these wheels. At the same time the rear pair of wheels (now the leading wheels in backing) are unlocked from their position parallel to the body frame so that they may be manually steered by the operator to lead the trailer and motor truck in the desired path.

It may frequently be necessary to stop backing and pull ahead a short distance to reposition the truck and trailer for further backing. When this is to be done, the rear wheels are again locked in position parallel to the body frame and the front wheels are unlocked from such parallel position and are connected to the draw-bar so as to be steered by the latter in pulling ahead.

It will be apparent that at the end of the previous backing operation the front draw-bar will frequently lie in angular position relative to the center line of the trailer so that it is impossible to connect the wheels to the draw-bar without shifting the wheels around into alinement with the draw-bar. It is an object of my invention to produce an improved construction which permits of unlocking the wheels from their position parallel to the body frame and manually swinging them into position parallel to the draw-bar so that they may be connected to the latter preparatory to pulling ahead; also the reverse of this operation, that is to say, disconnecting the wheels from the draw-bar and swinging them into position parallel to the body frame to be locked in such position preparatory to another backing up operation.

Another object of the invention is to provide an improved steering gear of simple and durable construction having a minimum number of joints, and adapted to accommodate itself to all of the conditions hereinbefore mentioned and many other conditions encountered in practical use so as to facilitate to the maximum degree the moving of a trailer and its tractor into and out of difficult positions.

Another object of the invention is to provide a steering gear adapted for use in a trailer wherein the draw-bar is mounted on the body frame and said frame is supported upon the axles by springs and to arrange the steering gear so that the relative approaching and receding movements between the body frame and the axles will not affect the steering gear or change the positions or angularity of the wheels in any way.

A further object is to provide a trailer truck of the type just outlined in which the steering gear is mainly mounted on the axle and comprises a portion which extends upward for the connection to the draw-bar; and in which the steering gear or a portion thereof may be detachably locked directly to the axle, so that the wheels may be held in position parallel to the body frame, or may be allowed to be swung, as may be desired, either by the draw-bar or manually by the operator independently of the draw-bar.

Another object of the invention is to provide an improved steering gear in which the inclined steering lever is connected to the draw-bar at the extreme forward end of the latter beyond the end of the body frame, whereby the steering lever may be conveniently attached to and detached from the draw bar and will provide a long leverage for manually turning the wheels, and whereby the connection will be as direct as possible from the coupler head on the inner draw-bar section to the wheels so as to eliminate any effect on the steering which might be caused by looseness or play between the sections of the draw-bar, or in the mounting of the latter on its king pin.

Another object of the invention is to provide in a trailer truck having a permanently mounted draw-bar and having an axle arranged with dirigible wheels, a wheel steering and locking means comprising two main parts, one of which is mounted on the mid-portion of the axle to swing on a vertical pivot and is at all times connected to the wheels, and the other of which parts is at all times connected to the first part and is mounted to swing up and down so that it may be secured either to the draw-bar or to a bracket rigid with the axle, or be capable of free lateral movement, at the will of the operator.

A further object is to provide in a trailer truck of the type outlined an improved coupling head of simple and durable construction which is designed to afford quickly manipulated and secure attachment for the draft means, to operate efficiently under the varied conditions of the truck being moved forward or backward and of drawing other trailers, and to positively lock the steering lever by means readily releasable within a cushioned seat adapted to prevent all side play of the lever.

In the accompanying drawings Figure 1 is a sectional elevation illustrating one end of a trailer truck embodying my invention.

Fig. 2 is a plan view showing somewhat diagrammatically a trailer truck connected with the rear portion of a motor truck or other tractor, and illustrating one position of the parts in the operation of backing the trailer, the wheels adjacent to the motor truck being locked parallel to the body frame, leaving the draw-bar free to swing independently, while the rear wheels are left free to be swung manually by the operator in steering the trailer.

Figs. 3 and 4 are enlarged fragmentary detail views, in plan and sectional elevation respectively, showing the parts of the steering gear and wheel locking means.

Fig. 5 is a fragmentary detail view showing in sectional elevation the construction of the coupler head, and its connection with the steering gear.

Figs. 6 and 7 are detail plan views of parts of the steering gear mounted on the axle.

Fig. 8 illustrates in perspective the device for locking the steering lever in the coupler head.

In the exemplary embodiment of the invention which is shown in the drawings, the trailer, aside from the steering gear, is similar in construction to that shown in my prior Patent No. 1,245,676, issued November 6, 1917, to which reference may be had for general information as to the structure of this type of trailer.

Referring to Fig. 2 of the accompanying drawings, the reference numeral 7 designates a drawing unit or tractor which is connected by means of a link 8 to a coupler head 9 on the draw-bar 10 of a trailer truck which is constructed in accordance with my present invention. The running gear of this trailer truck comprises the usual body frame or chassis frame 11 mounted by means of a suitable spring suspension 18 upon a pair of axles 17 having pivoted stub axles at their ends upon which the wheels 12 are mounted. The draw-bar is pivoted at its rear end to a cross piece 14, forming part of the body frame, by means of a king pin 15. In the embodiment illustrated, the draw-bar is a permanently mounted draft means, and comprises an outer casing with an inner spring cushioned draft-bar, substantially as shown in my prior Patent No. 1,304,261, issued May 20, 1919. The forward end of the draw-bar housing projects through a slot or guideway formed between the end of the frame 11 and a supporting bar or rest 16 (Figs. 1 and 4) attached thereto. The other section of the draw-bar slides longitudinally within this housing and carries the coupler head 9 at its forward end. Means designated 13 are provided for locking the draw-bar housing in central position on the body frame in a manner fully disclosed in my prior Patent No. 1,305,521, issued June 3rd, 1919.

The means for connecting the draw-bar to the dirigible wheels for steering the latter, for locking the wheels at right angles to the axle, and for permitting manipulation of the wheels by hand will now be described. The two steering arms 19 of each pair of wheels are directly connected together by a single tie rod 20 which maintains the wheels in parallelism at all times.

A lever 21 is mounted for pivotal movement upon a vertical king pin 22 which is carried by a bracket 23 mounted centrally of the axle 17. The bracket 23 is formed with a bearing plate 23ª (Fig. 6) in which the king pin 22 is centered and which supports the lever 21. Laterally extending wings 23ᵇ, integral with the bracket 23, overlie the axle 17 and are rigidly secured thereto, as by means of bolts 23ᶜ and 23ᵈ, against longitudinal or rotary movement of the bracket relative to the axle.

The lever 21 in the present instance is substantially T-shaped (Figs. 3 and 7), one arm of the lever normally extending at right angles to the axle 17 and being connected by a drag link 24 to an extension on one of the steering arms 19 of the wheels, suitable joints being employed at the ends of said drag link. The other arms of the lever 21, which are in alinement with each other and normally parallel to the axle, have bearings 25 at their ends to receive a pivot pin 26 which pin also extends into bearings 27 on the forked end of a steering lever 28 (Figs. 3 and 4). The pin 26 may be fixed in either pair of bearings 25 or 27, being rotatable in the other bearings so as to permit of a swinging movement of the lever 28 up and down on said pin as an axis.

The lever 28 is composed of two telescoping sections, an outer section 28ª carrying the forked end and bearings 27, and an inner section 28ᵇ slidable for a part of its length within the outer section. A sleeve 28ᶜ is fixed on the inner section and slidably encloses the forward end of the outer section.

The lever 28 is detachably connected to the extreme forward end of the draw-bar by means of a ball 29 (Figs. 5 and 8) carried on the forward end of the section 28ᵇ and releasably engaged by a locking device located in the coupler head 9. The said locking device comprises a socket member 30 adapted to receive the ball 29 and forming an annular block slidably supported within a chambered barrel 31 formed on the lower front portion of the coupler head. A stem 32 extending through the base of the chamber and having stop means on its outer end retains the member 30 in the chamber and limits the action of a cushioning spring 33 located between the socket member and the base of the chamber. A locking lever 34 having a pivot 35 mounted on the coupler head 9 carries a yoke 36 which embraces the section 28ᵇ of the steering lever rearwardly of the ball 29 and locks the latter in its seat upon the socket member 30. The yoke is held in locking position by a spring 37 suitably mounted between the lever 34 and the upper wall of the coupler head. A lug 36ª is formed on the yoke 36 and extends over the wall of the chamber 31, acting as a stop, when the steering lever is disconnected, to hold the yoke in position to receive the ball 29.

The steering lever is connected to the coupler head by simply sliding the ball end 29 into engagement with the socket member, in which operation the yoke is forced upward over the ball. The yoke is brought into locking position back of the ball by the spring 37 when the engagement is complete. To release the steering lever the lever 34 is depressed, thus raising the yoke 36 and permitting the ball 29 to be forced out of engagement therewith by the action of the spring 33.

A ball 38 and a recess 39 normally closed by a spring actuated dog 40 are provided upon the coupler head 9 for the attachment of coupling means, substantially as set forth in my said Patent No. 1,245,676. A projecting lug 41 formed on the forward end of the coupler head is provided to support the coupling means when used manually or when disconnected from the tractor.

When the lever 28 is detached from the draw-bar it may be manipulated manually to position the wheels at the desired angle, and if desired it may be lowered into engagement with an upstanding device 42 on the bracket 23 on the axle so as to secure the lever against lateral swinging movement and thereby hold the wheels at right angles to the axle or parallel to the body frame. The device 42 as illustrated comprises a lug adapted to enter a recess formed on the under side of the steering lever.

In the operation or use of the trailer, the rear wheels are normally locked at right angles to the axle through the steering lever 28 which is locked to the draw-bar coupler head 9 by the locking device 29—36, the draw-bar in turn being locked in its central position on the body frame by the locking means 13. The front wheels are left free to be swung by the draw-bar while the trailer is travelling forwardly by disconnecting the locking means 13 leaving the draw-bar free to swing laterally and carry with it the steering lever 28.

When it is desired to back up the trailer, the front wheels (now the following wheels) are locked at right angles to the axle by disconnecting the lever 28 from the draw-bar and lowering said lever into engagement with the stop device 42 on the bracket 23. The front draw-bar which is coupled to the motor truck is thus left free to swing laterally without affecting the wheels. The rear wheels (now the leading wheels in backing) may be manually steered by unlocking the device 13 which frees the draw-bar 10 and permits it to swing together with the lever 28. Preferably, the lever 28 is disconnected from the draw-bar by uncoupling the lever 28 from the draw-bar coupler head, whereby the wheels may be steered manually by swinging the lever 28 free of the draw-bar. To increase the leverage on the wheels and facilitate steering them by hand the telescoping sections of the lever may be extended to their maximum length.

It is sometimes necessary after backing up to pull ahead a short distance so as to straighten out the motor truck preparatory to further backing and when this is to be done the rear wheels of the trailer are again locked at right angles to the axle while the front wheels are unlocked by raising the lever 28 out of engagement with the fixed stop 42 and securing said lever to the draw-bar by the locking device 29—36. It usually happens at the end of the backing up operation, that the front draw-bar which is attached to the motor truck extends at an angle to the longitudinal center line of the trailer so that when the lever 28 is raised vertically out of engagement with the locking device 42 on the axle bracket it is not in the proper position to connect with the locking device on the draw-bar coupler head. The lever and the wheels therefore must be swung laterally to position the lever directly beneath and in general alinement with the draw-bar 10 in order to couple the locking device 29—36. This operation is very easily performed with the steering gear herein shown and the reverse of the operation is equally easy, that is to say, the detachment of the lever 28 from the draw-bar when extending at an angle to the center line and the movement of the lever into position beneath the center line so as to engage with the device 42 for locking the wheels to the axle.

My construction allows for a variety of relationships of the various parts to facilitate the performance of their duty under the varying conditions of use. The wheels may be locked at right angles to the axle in two ways, to-wit: by engaging the lever 28 with the stop device 42 on the axle or by coupling the said lever to the draw-bar and locking the draw-bar to the body frame by the device 13. The wheels may be manually steered when desired by unlocking the device 13 while the lever 28 is coupled to the draw-bar and swinging the draw-bar to turn the wheels, but this manual steering is preferably accomplished by detaching the lever 28 from the draw-bar and swinging the wheels directly by said lever.

It will be seen that the steering gear herein disclosed is of very simple and durable construction, comprising a minimum number of parts and therefore a minimum number of joints at which looseness or play can occur. By reason of the fact that the steering lever 28 extends to the extreme end of the draw-bar, the lever may be conveniently coupled to and uncoupled from the draw bar, whereupon the lever is in convenient position to be manually swung, and on account of its length affords good leverage for the purpose of shifting the wheels. Furthermore, the lever provides a direct connection between the steering element on the axle and the element (the coupler head 9) to which the pulling and steering power is first applied, so that any play or lost motion between the sections of the draw bar, or at the king pin mounting thereof, will not affect the accuracy of the steering.

In some of the trailers of the prior art, by reason of the construction of the steering gear employed therein, any relative approaching or receding movement between the body frame and the axle would act to swing the wheels. This is an effect which is very objectionable, and which is entirely eliminated by my construction. The said approaching and receding movement is taken care of by relative motion between the telescoping parts of the steering lever 28, without in any way affecting the position of the steering means as a whole or the wheels, and the telescoping lever 28 also accommodates the relative sliding movements of the inner draw bar section with relation to the outer section, such movements being allowed for by the cushioning springs within the outer section. In all of these relative movements of the parts the steering means receives its motion directly from the coupler head 9.

A further distinct advantage resides in my construction of the locking device in the coupler head which receives the outer end of the steering lever. Any looseness or lateral play in the connection between the draw bar and the steering lever permits the latter to swing independently while the truck is in motion and causes the wheels to travel irregularly. At the same time the connection must be flexible enough to accommodate the relative movements of the parts just described. Also it must be a postive lock which prevents the steering lever from being shaken out or otherwise accidentally disengaged in operation. My construction of the ball upon the end of the steering lever secured between the yoke of the locking lever and the spring pressed socket block, provides a firm connection, positively locked and sufficiently flexible. It also aids rapid manipulation of the steering lever when required by forcing the telescoping forward section of the steering lever free of the coupler head upon tripping the hand lever 34 to release the yoke from the ball.

While I have shown a preferred embodiment of my invention in the drawings and have described the same in considerable detail, I recognize that many modifications may be made without departing from the spirit and scope of the invention and therefore do not intend to limit the invention to the construction disclosed except as specified in the appended claims.

I claim as my invention:

1. A trailer truck having, in combination, a body frame, an axle having swivelled carrying wheels thereon, springs supporting said frame from said axle, a draw bar pivotally mounted on said frame, a tie rod connecting said wheels to maintain them in parallelism, a steering lever pivoted on a vertical axis on said axle and connected with said wheels, an inclined lever having its front end detachably connected to said draw bar and having its rear end connected to said steering lever to rock up and down thereon but to cause rotation of said steering lever about its axis, means for locking said draw bar to the body frame in a central position, and means rigid with said axle with which said inclined lever is arranged to be interengaged when disconnected from the draw bar whereby to hold the wheels at right angles to the axle.

2. A trailer truck having, in combination, a body frame, a draw bar pivotally mounted thereon, an axle having swiveled carrying wheels, and means mounted mainly on said axle for steering the wheels and including a part which is arranged to be detachably connected either to the draw bar or to an element mounted directly on the axle selectively.

3. A trailer truck having, in combination, a body frame, a draw bar pivotally mounted thereon an axle having swiveled carrying wheels thereon, and means mounted mainly on said axle for steering the wheels and including a lever pivoted to the remainder of the steering means to swing up and down with relation thereto, said lever being arranged to be detachably connected to the draw bar whereby the wheels will swing with the draw bar, and adapted to be detached from the draw bar and lowered into position for engagement with a part on said axle whereby the wheels may be locked in right angular relation to the axle.

4. A trailer truck having, in combination, a body frame, a main axle having swiveled carrying wheels thereon, springs supporting said frame from said axle, a draw bar comprising an outer housing section pivotally mounted on said frame and an inner section slidable within the outer section and carrying a coupling element on its forward end, means for locking said outer section of the draw bar in central position on the body frame, and steering means comprising two main parts one part of which is mounted on the axle to swing on a vertical pivot and is connected to the wheels for swinging the latter, the other part of which is mounted on the first part to swing therewith and also to swing up and down with relation thereto, the second mentioned part being of telescoping construction, means providing a detachable connection between the free end of the second mentioned part and the forward end of the inner section of said draw bar, and means on said axle with which the second mentioned part is arranged to be interlocked when detached from the draw bar and swung downwardly whereby to lock the wheels at right angles to the axle.

5. A trailer truck having a body frame, draft means permanently mounted on the frame, an axle equipped with dirigible wheels, and means by which said wheels may be selectively connected to said draft means or locked to said axle, said means including a member pivoted to swing up and down, and means co-operating with said member whereby a connection may be established between the wheels and the draft means for steering the wheels, or the wheels may be locked at right angles to the axle, as desired.

6. A trailer truck having, in combination a body frame, draft means carried by the frame, an axle having dirigible wheels thereon, and steering means carried mainly by said axle and arranged selectively to be locked directly to the axle, or to be connected to said draft means, or to be manually operated to swing the wheels independently of said draft means, as desired.

7. A trailer truck having a body frame carrying a pivoted draw bar and an axle equipped with dirigible wheels, in combination with a steering lever pivoted on the mid portion of said axle to swing on a vertical axis and connected to said wheels, a lever pivotally attached to the first mentioned lever to swing therewith about said axis and to swing up and down with relation to the first lever, means for detachably locking the second lever directly to the axle to prevent swinging of said wheels, and means to provide a detachable connection between said second lever and said draw bar whereby the wheels may be steered from the draw bar.

8. A trailer truck having a body frame carrying a pivoted draw bar and an axle equipped with dirigible wheels, in combination with a steering lever pivoted on the mid portion of said axle to swing on a vertical axis and connected to said wheels, a lever pivotally attached to the first mentioned lever to swing therewith about said axis and to swing up and down with relation to the first lever, means for detachably locking the second lever directly to the axle to prevent swinging of said wheels, and means to provide a detachable connection between said second lever and said draw bar whereby the wheels may be steered from the draw bar, said second lever being arranged to be detached from the axle and the draw bar and being then free to be operated manually for swinging the wheels.

9. A trailer truck having a body frame which carries a pivoted draw bar and an axle which is equipped with dirigible wheels, in combination with a steering lever pivoted on the mid portion of said axle to swing on a vertical axis and connected to said wheels, a second lever pivotally attached to the first lever to swing therewith and also to swing up and down with relation thereto, means for locking the second lever directly to said axle, means for locking the upper end of the second lever directly to said draw bar and means for allowing lost motion between the steering lever and the draw bar.

10. A trailer truck having a body frame which carries a pivoted draw bar and a fixed axle which is equipped with dirigible wheels, in combination with a steering lever pivoted on the mid portion of said axle to swing on a vertical axis and connected to said wheels, and means to provide a detachable connection between said lever and the free end of said draw bar beyond the end of said body frame.

11. A trailer truck having a body frame which carries a pivoted draw bar having an extensible member and an axle which is equipped with dirigible wheels, in combination with a steering lever pivoted on the mid portion of said axle to swing on a vertical axis and connected to said wheels, and a lever pivotally attached at one end to said steering lever to swing therewith and also to swing up and down with relation thereto, the opposite end of the latter lever having means for its detachable connection to said extensible draw bar member, and said latter lever having means for longitudinal extension and contraction.

12. A trailer truck having, in combination, a body frame, an axle supporting said frame and having swivelled wheels thereon, steering means mounted mainly on said axle including a steering lever having its outer end forming a ball, a draw bar pivotally mounted on said frame, a coupler head carried by said draw bar, and a device mounted in said coupler head adapted to receive and detachably lock the ball end of said steering lever to said coupler head comprising a chamber formed on said coupler head having a compression spring located in its base, a sliding socket member carried in said chamber abutting said spring and having means for limiting the movement of said member outwardly from said chamber, a locking lever pivoted to said coupler head and having a spring pressed yoke adapted to embrace said steering lever and lock the ball end thereof in firm contact with said socket member, said locking lever being operable to release said yoke from said steering lever.

13. In a trailer truck having a draw bar pivoted on the body frame and a steering lever pivoted on the axle, means for detachably locking said steering lever to said draw bar, comprising a ball formed on the swinging end of said steering lever, a barrel rigidly attached to the swinging end of said draw bar having its axis in substantial alinement with said steering lever, a compression spring carried in said barrel, a socket member slidable within said barrel and adapted to receive said ball and thereby being forced inwardly to compress said spring, and a locking lever pivoted to said draw bar having a yoke arranged to detachably engage said ball oppositely from said socket member whereby said ball is secured against withdrawal from said socket.

14. In a trailer truck having a draw bar pivoted on the body frame and a steering lever pivoted on the axle, the combination of a ball formed on the swinging end of said steering lever, a coupler head mounted on said draw bar, a spring pressed socket member mounted on said coupler head adapted to receive said ball and thereby compress said spring, and a forked element pivoted on said coupler head having detachable engagement with said ball oppositely from said socket member whereby said ball is locked against withdrawal from said socket.

15. In a trailer truck having a body frame and an axle, the combination of an extensible draw bar pivoted to said frame, an extensible steering lever pivoted on said axle, and having telescoping sections with a sliding joint, said draw bar and steering lever being detachably interconnected at their outer ends, and means for protecting said sliding joint comprising a sleeve mounted on one of said sections arranged to extend over and enclose at all times the exposed sliding surfaces of said joint.

16. A trailer truck having, in combination, a draw bar comprising two sections, one of which is pivoted to the trailer and the other of which is arranged to slide with relation to the first-mentioned section, a steering lever comprising two relatively slidable sections one of which is pivoted to the trailer and connected to the wheels for turning the wheels, and means for detachably connecting the other section of said steering lever to the second-mentioned section of said draw bar.

17. In a trailer truck, the combination of a pivoted draw bar, a pivoted steering lever having relatively slidable sections, and means for operatively connecting the free end of said steering lever to said draw bar comprising a ball mounted on said steering lever, a spring pressed socket mounted on said draw bar and a locking device operatively associated therewith, said socket and locking device coacting to receive and retain said ball and to eject said ball from said socket when said locking device is released.

18. In a trailer truck, the combination of a pivoted draw bar, a coupler head mounted on said draw bar, a pivoted steering lever having relatively slidable sections, and a socket mounted in said coupler head, said socket opening rearwardly relative to said draw bar and adapted to receive and detachably retain the forward end of said steering lever.

19. In a trailer truck, the combination of a pivoted draw bar, a coupler head mounted on said draw bar, a pivoted steering lever having relatively slidable sections, a ball mounted on the free end of said steering lever, a spring pressed socket mounted in said coupler head and opening rearwardly to receive said ball, a locking lever pivoted on said coupler head adapted to engage and retain said ball in said socket and operable to release said ball thereby permitting said spring pressed socket to eject said ball from said coupler head.

20. In a trailer truck, the combination of a pivoted draw bar, a pivoted steering lever extending in the same general direction with said draw bar and being longitudinally extensible, a ball mounted on the extended end of said lever, and means including a socket mounted on said draw bar adapted to be detachably engaged with said ball in the longitudinal extension of said lever.

21. A trailer truck having a body frame, a draw-bar pivoted on said frame, means for locking said draw-bar in rigid relation to said frame, an axle equipped with dirigible wheels, a lever pivoted on said axle to swing on a vertical axis and having steering connection with said wheels, a member pivotally attached to said lever and arranged to swing laterally with said lever but independently swingable in a vertical plane, said member being selectively attachable to said draw-bar or to said axle.

22. A trailer truck comprising, in combination, a running gear including dirigible wheels, a draw-bar, a steering bar, and connections arranged to steer said wheels, said steering bar being mounted to swing horizontally with said draw-bar and also being mounted to swing up and down, and means for optionally securing said steering bar in its different positions of elevation either to the draw-bar or to a fixed part of the running gear.

23. In a trailer, the combination of a chassis frame, an axle, a spring suspension for the chassis frame upon the axle, a draw bar pivotally supported upon the chassis frame, a steering lever which can be detachably engaged with the draw bar, and means on the axle for locking the steering lever in the central position.

24. In a trailer, the combination of a chassis frame, an axle, a spring suspension for the frame upon the axle, and a telescoping steering lever pivoted to the axle in a horizontal plane and collapsible, and means for locking the collapsed lever in a central neutral position.

In testimony whereof, I have hereunto set my hand.

ADDI BENJAMIN CADMAN.